United States Patent [19]
Maciejczak

[11] Patent Number: 4,789,947
[45] Date of Patent: * Dec. 6, 1988

[54] INSPECTION SYSTEM AND METHOD FOR MECHANICAL STRUCTURES

[76] Inventor: Robert A. Maciejczak, 7640 W. Devon Ave., Chicago, Ill. 60631

[ * ] Notice: The portion of the term of this patent subsequent to Oct. 29, 2002 has been disclaimed.

[21] Appl. No.: 791,326

[22] Filed: Oct. 25, 1985

Related U.S. Application Data

[63] Continuation-in-part of Ser. No. 466,147, Feb. 14, 1983, Pat. No. 4,550,376.

[51] Int. Cl.⁴ .................................................. H04N 7/18
[52] U.S. Cl. ..................................... 364/512; 358/100; 364/506
[58] Field of Search ............... 364/506, 508, 512, 579; 73/855; 165/11.2; 358/100, 108; 901/1

[56] References Cited

U.S. PATENT DOCUMENTS

| | | | |
|---|---|---|---|
| 3,967,242 | 6/1976 | Koo et al. | 364/468 |
| 4,459,526 | 7/1984 | Griebler | 318/576 |
| 4,460,302 | 7/1984 | Moureau et al. | 414/5 |
| 4,460,920 | 7/1984 | Weber et al. | 358/100 |
| 4,515,747 | 5/1985 | Creek et al. | 376/249 |
| 4,526,311 | 7/1985 | Schröder | 228/119 |
| 4,550,376 | 10/1985 | Maciejczak | 364/512 |
| 4,636,137 | 1/1987 | Lemelson | 414/730 |
| 4,656,509 | 4/1987 | Matsuyama et al. | 165/11.2 |
| 4,657,728 | 4/1987 | Coppa et al. | 358/100 |

FOREIGN PATENT DOCUMENTS 2565954 12/1985 France ........................ 364/506

OTHER PUBLICATIONS

Better Roads, vol. 55, No. 11, Nov. 1985, pp. 20-22.

Primary Examiner—Parshotam S. Lall
Assistant Examiner—S. A. Melnick
Attorney, Agent, or Firm—Michael G. Berkman

[57] ABSTRACT

In conjunction with an unmanned, remotely controllable apparatus for inspecting, testing and viewing and for examination and evaluation of the general condition, state of repair, and of the quality of fabrication of mechanical structures including bridges, an assembly including a guide track carried by a space frame fastened to extend transversely of a bridge or other structure at an underside thereof. The track supports a carrier adapted for transporting, viewing, examining, treating and testing apparatus for controlled movement and manipulation of the apparatus along a path delineated by the guide track. In a preferred embodiment of the invention the carrier supports one or more turntables and one or more articulated arms and linked arm assemblies at remote ends of which selectable viewing and testing devices are attachable, thus facilitating physical access to and penetration into restricted mechanical zones to be viewed, examined and treated. The space frame itself may be moved lineally along the bridge, on an underside thereof so that through the combination of the transversely moving carrier and the lineally movable space frame, an entire areal zone may be traversed.

16 Claims, 2 Drawing Sheets

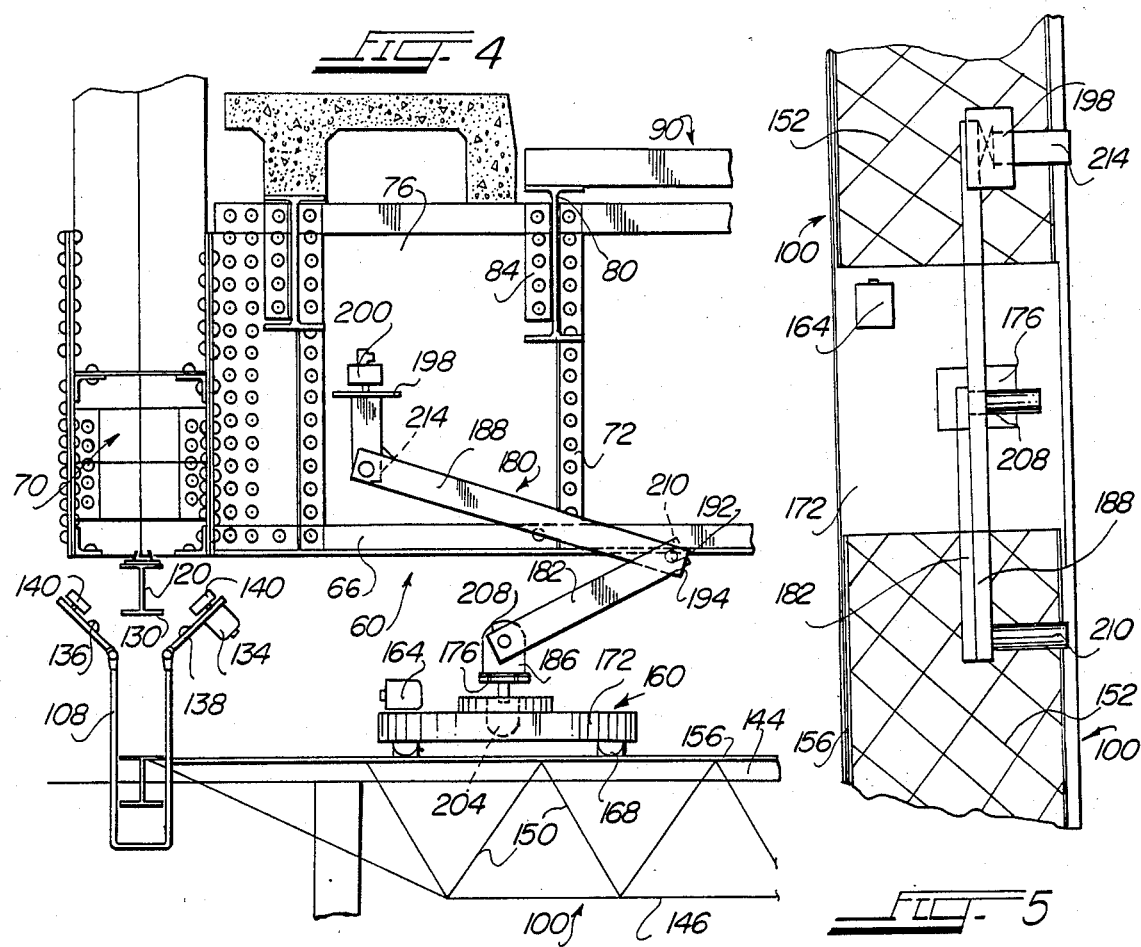
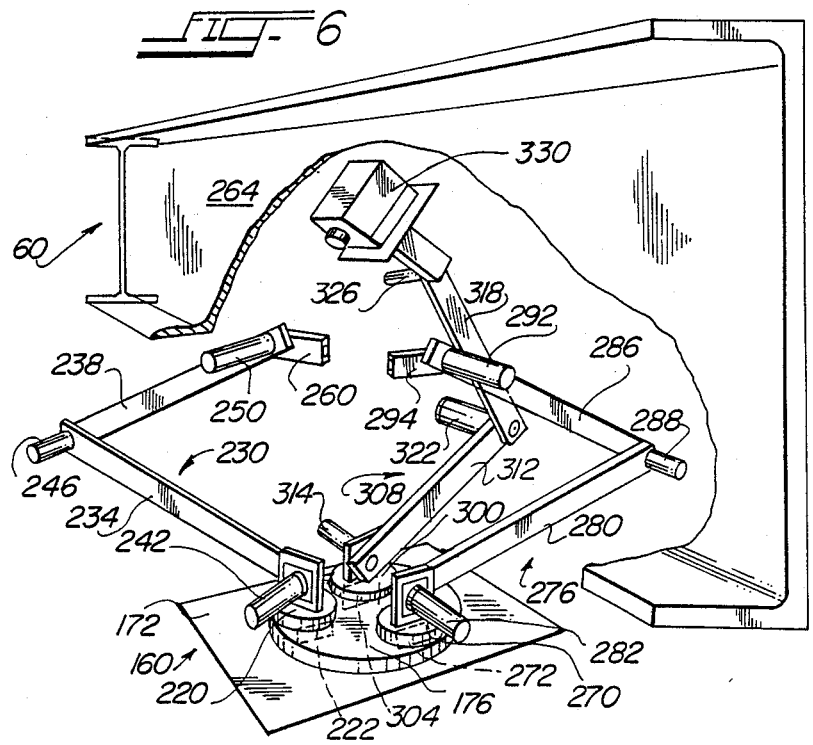

INSPECTION SYSTEM AND METHOD FOR MECHANICAL STRUCTURES

RELATED APPLICATION

This application is a continuation-in-part of Maciejczak application Ser. No. 06/466,147, filed Feb. 14, 1983, now U.S. Pat. No. 4,550,376.

BACKGROUND AND FIELD OF THE INVENTION

The present invention relates to remotely controlled apparatus and methods for conducting unmanned inspection and testing of mechanical structures. More particularly, the invention is directed to apparatus and techniques for safely and effectively carrying out meaningful inspection and testing in zones such as the under structure of bridges which can ordinarily be reached and viewed only with great difficulty and not without substantial risk to personnel.

The methods and apparatus finding utility in the present invention are described generally in Maciejczak U.S. patent application Ser. No. 06/466,147, now U.S. Pat. No. 4,550,376, and the entire disclosure of that application is hereby specifically incorporated herein by reference to the extent it is not inconsistent herewith.

SUMMARY OF THE INVENTION

A principal object of the present invention is to provide a novel assemblage of coordinated apparatus through the use of which bridges and bridge-like structures may be safely and effectively examined and tested and by which useful data may be developed for viewing, study and recordation.

An important feature of the present invention is the provision of a space frame which carries an articulated arm assembly secured for travel along the space frame and to traverse the structure to be viewed, examined, treated, or tested.

A novel feature of the invention is that the space frame is fastened to the under structure of a bridge for controlled travel along a rail attached thereto.

A related feature of the invention is that the space frame carries a track upon which a carrier rides, and the carrier, in turn, supports one or more turntables and one or more articulated arms or arm assemblies.

A specific feature of the assemblage of the invention is that there is provided apparatus for manipulatively supporting viewing cameras, related video equipment, sensors and electrical and mechanical testing and treating devices, and for sending and for receiving and accumulating data and for transmitting the data to a remote station for perception, study, evaluation and recordation.

It is an important feature of the invention that there is provided the combination of a controlled, travelling turntable and space-perusing manipulable articulated arms and extension arms, thus ensuring access to and effective examination of remote and difficultly reachable areas simply and easily—areas ordinarily not otherwise within the scope of direct visual inspection.

A related feature of the invention is that turntable travel, turntable rotation as well as extension, positioning and the articulation of the apparatus and device-carrying arms of the assembly may be monitored and may be directed and controlled remotely.

Yet another feature of the invention is that there is provided a carrier which supports one or more turntables, each adapted to carry selectable scanning, viewing, inspecting, treating and testing apparatus including photographic equipment, infra-red sensors, sonar sensors, electromagnetic flux generating equipment, magnetic eddy sensors, x-ray apparatus, sand blasters and hydroblasters, and mechanical scrapers and impact tools.

A related feature of the invention is that the turntable and associated arm assemblies may be used to carry out maintenance, refurbishing and restoration procedures.

An important advantage of the present invention is that all operations carried out utilizing the viewing, treating and testing equipment may be monitored in real time at a remote station, and may be recorded as well for future review and reference.

Other features, objects and advantages of the invention will be evident from the following detailed description of preferred embodiments considered in conjunction with the accompanying drawings.

BRIEF DESCRIPTION OF THE DRAWINGS

FIG. 4 is a fragmentary view, on an enlarged scale, of a space-frame-carried carrier cart and associated turntable supporting an articulated arm assembly, according to the invention;

FIG. 5 is a top view showing a carrier-supported articulated arm assembly according to the invention; and FIG. 6 is a perspective view, with parts cut away, illustrating schematically, a modified embodiment of the invention in which several turntables and associated arm assemblies and apparatus are carried by a primary turntable serving as a turret mechanism, and sensor elements being directed to opposite sides of a beam being examined.

DESCRIPTION OF PREFERRED EMBODIMENTS

The aims and objects of the invention are realized by providing remotely controlled and manipulable inspection, testing, and treating apparatus and equipment carried on a platform or carrier which is itself also remotely controllable to traverse selectable predetermined paths and areas delineated by guide elements including rails, flanges and tracks secured to and carried by the structure being examined and tested. One or more remotely controllable turntables fastened to and riding on the carrier for travel therewith support, in turn, an articulated platform, arm or arm assemblies. Through remote controls, the arms are directed rotationally and can also be directed angularly and selectively extended and retracted to facilitate viewing, exploring, treating, and testing in remote and in difficultly accessible zones of the structure being surveyed, studied and evaluated.

In a preferred embodiment of the invention the equipment and apparatus-carrying guide structures include a track-carrying space frame in conjunction with structure-mounted rails along which the space frame travels. Preferably, the space frame is disposed to span the structure or a module or section of the structure to be studied and is shiftable along support flanges or rails fastened to and carried by the structure and extending lineally therealong. The space frame itself is provided with a coextensive track along which the apparatus-carrying platform or carrier travels in traversing given selectable, predetermined inspection paths. In the particular mechanical arrangement described, there is achieved a complete access coordinate system enabling one to direct the viewing, testing and treating apparatus to traverse and scan the entire areal zone delineated and encompassed by the combination of the lineally-traveled path of the space frame and the transversely-traveled path of the carrier and associated apparatus supported thereon.

In the exemplary embodiment of the invention described herein, the device or instrument-carrying platform is supported to travel along a space frame which is itself fastened to traverse the underside of a bridge structure.

Figure 1:
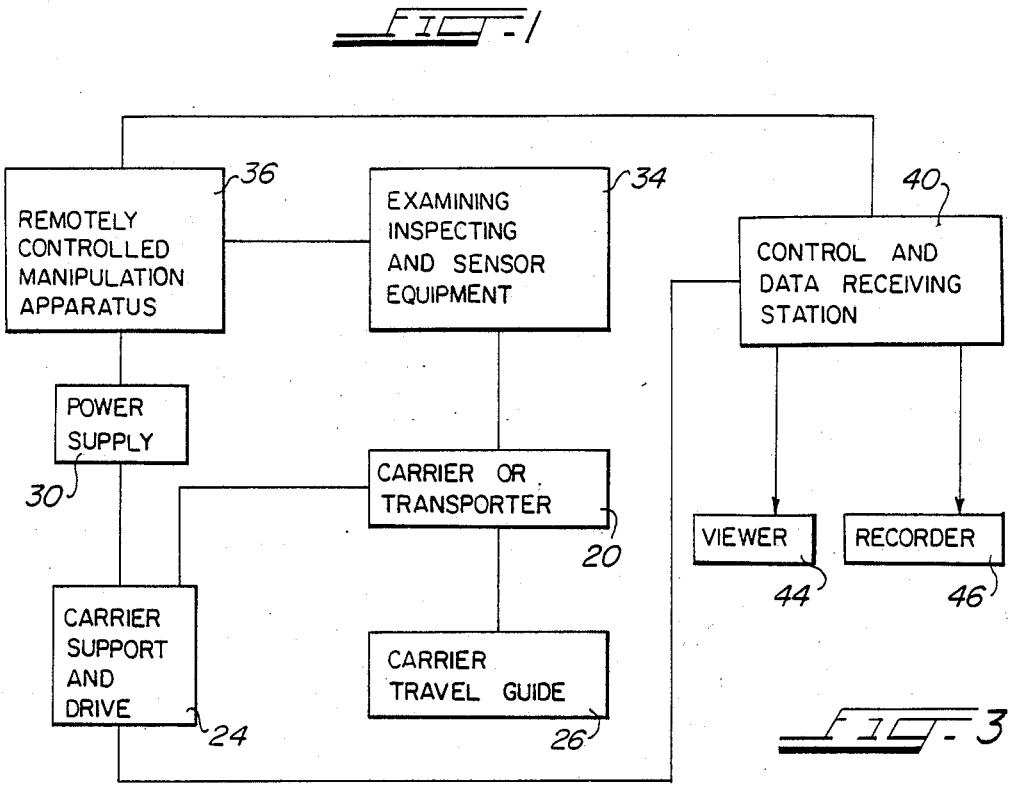
FIG. 1 is a block diagram showing a remotely controlled and operable inspection and treating system engineered in accordance with the principles of the present invention and identifying schematically and generally principal functional cooperating components of the system.

Referring now to the drawings, and particularly to FIG. 1, the inspection, testing and treating assembly of the invention is shown schematically in a block diagram format as including a carrier or transporter 20 supported on a carrier support and drive 24 and movable along a carrier travel guide 26. The carrier 20 carries the examining, inspecting, treating and sensor equipment.

A suitable power supply 30 energizes the carrier support 24 and the carrier 20, the latter transporting selectable apparatus and devices, including examining, inspecting and sensor equipment 34. Remotely controlled equipment-manipulation apparatus 36 for directing the apparatus, devices and inspecting and sensor equipment, connected to a remote control and data receiving station 40, supplies visual information and data to a viewer 44 and to a recorder 46.

Figure 3:
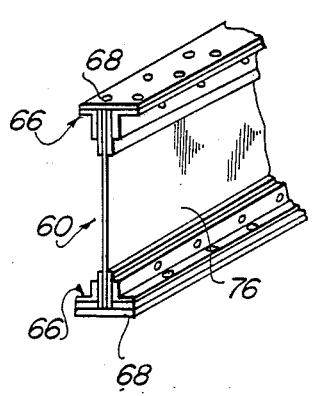
FIG. 3 is a cross-sectional view in perspective and showing details of the floor beam assembly on a built up plate girder of the bridge of FIG. 2.
Figure 2:
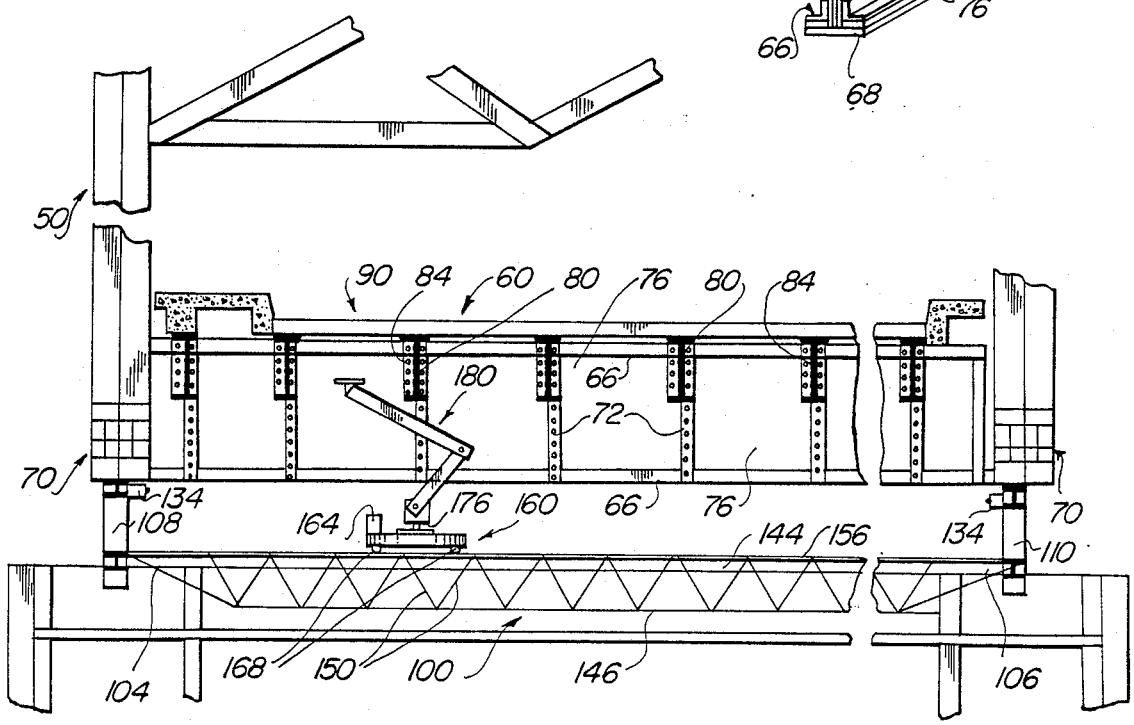
FIG. 2 is a cross-sectional view showing a space frame, according to the invention, attached to the underside of a bridge structure and indicating schematically a space-frame-carried cart supporting a turntable and an articulated arm assembly for presentation and manipulation of inspecting, testing and treating apparatus.

As indicated diagrammatically in FIG. 2, the present invention finds particular utility in the inspection of large mechanical structure such as bridges. The schematic cross-sectional representation of a bridge 50 shown includes a floor beam assembly 60 including a built up plate girder (FIG. 3) composed of flange angles 66 and cover plates 68, top and bottom, carried by longitudinal cord assemblies 70. Spaced along and constituting part of the floor beam assembly 60 are stiffener angles 72 and upstanding, intermediate structural panels 76 or web plates sandwiched between and fastened to the flange angles 66 and to the stiffener angles 72. Stringers in the form of I-beams 80 are secured to the floor beam 60 and to the stiffener angles 72 by means of connection angles 84, and extend longitudinally of the bridge 50 to support a bridge deck assembly 90. The specific bridge structure indicated does not itself constitute a part of the present invention. Rather, the invention is useful in carrying out the inspection and testing of many and varied types of mechanical structures of which bridges are typical examples.

Referring further to FIG. 2, and to FIG. 4, a space frame 100, in accordance with the invention, is shown as supported at each of its opposed ends 104 and 106 on hanger assemblies 108 and 110. The latter are attached to and depend from I-beams 120 fastened to extend longitudinally along the bridge at the opposed sides thereof. As shown, the I-beams 120 are secured at the cord assemblies 70 on the undersides thereof. Lower horizontally flanges 130 (FIG. 4) of the I-beams 120 serve as rails or guides along which the motor 134 propels the space frame 100 to traverse lineally along the bridge 50 or along a modular section of the bridge. As indicated schematically in FIG. 4, the hanger assembly 108 includes a pair of pivotally-mounted upper sections 136 and 138 which are swingable inwardly toward each other to bring space frame support wheels 140 into engagement with to overlie and ride upon the flange 130 of the I-beam 120.

The space frame 100 indicated in FIG. 2 as spanning the entire width dimension of the bridge 50 may be fabricated in any preferred physical load-supporting mechanical configuration and of any preferred structural material including steel, aluminum and aluminum alloys, and reinforced plastic. In the example illustrated, the space frame 100 takes the form of a laddered or latticed structure or truss having elongated upper and lower horizontal principal members 144 and 146 connected to one another by angled, stablizing and strengthening generally vertically extending auxiliary members 150, and FIG. horizontal extending bracing members 152 (FIG. 5). On its upper surface the space frame supports a surmounting track or runway 156 along which a traversing car, cart or carrier 160 is propelled to move across the entire lineal expanse of the space frame 100. A suitable remotely controlled driving motor 164 is coupled to wheels 168 of the carrier 160 for moving the cart along the space frame track 156. A platform 172 of the carrier 160 supports one or more turntables. A first turntable 176 carries an articulated arm assembly 180. In the particular embodiment of the invention shown, the arm assembly 180 includes a lower arm 182 coupled through a linking shackle or bracket 186 to the turntable 176, and an upper or extension arm 188 hingedly joined 192 to and extending from an outwardly directed end 194 of the lower arm 182.

At its end farthest from the turntable 176, the upper arm 188 is coupled to and supports a plate 198 which carries a device 200 for viewing or scanning or testing the structure, for example, the bridge 50, under examination.

As indicated schematically (FIGS. 4 and 5), the system described includes an electric motor or a hydraulic motor drive 204 for controlling movement of the turntable 176. A motor mechanism 208 at the shackle 186 controls pivotal movement of the lower arm 182, and a separate motor mechanism 210 at the elbow-like connection 192 of the lower arm 182 to the upper arm 188 controls pivotal movement of the upper arm 188. An individually controlled separate motor 214 controls the angular position of the plate 198 to which the viewing or testing apparatus or device 200 is secured.

In a modified embodiment of the invention (FIG. 6) there is provided a structure including two or more turntables, each having independent controls. As shown in FIG. 6, a turntable 220 having a control motor 222 is carried on the primary turntable 176 of the traversing car 160, the primary turntable 176 thus serving as a turret element. The turntable 220 supports an articulated arm assembly 230, the latter being generally mechanically and functionally similar to the first arm assembly 180 with articulated lower and upper arms 234 and 238 and control motor mechanisms 242, 246 and 250, at each end of each arm for controlling the extension and angular orientation of each arm and the second arm 238 carrying a second viewing device, sensing, treating or testing apparatus or device, or a tool 260, a sensor 260 being indicated schematically in FIG. 6. As shown, the sensor 260 is directed to the near side 264 of a beam 60 being examined.

Another turntable 270, also carried on the turntable 176 and energized by a motor 272, supports its own articulated arm assembly 276. The latter is provided with physical components including a first arm 280 with a drive motor 282, a second or extension arm 286 with its drive motor 288, and a drive motor 292 for controlling the positioning of a viewing or testing device 294, being a sensor in the FIG. 6 example. The assembly 276 has extension and positioning capabilities similar to those of the assemblies 180 and 230 previously described and is capable of being controlled and operated independently of the other assemblies. Similarly, the turntable 270 may be rotated independently of the other turntables 176 and 220.

It will be appreciated that the combination of the separately and independently manipulable turntables and their arm assemblies operating in conjunction with viewing, inspecting, testing and treating devices imparts unique and exceedingly useful versatility to the system of the invention.

When using a single turntable 176, only, and a single articulated arm assembly 180, the arm assembly will ordinarily be employed to carry a camera or other viewing device, or special photographic apparatus. With two apparatus-carrying turntables and two corresponding articulated arm assemblies, one of the assemblies may conveniently be used to carry a viewing device and the second to carry a sensor or a tool mechanism such as a sand blaster, paint spray head, compressed air blaster, hydroblaster or light source.

With the addition of a third turntable 300 provided with a drive motor 304 and supporting an articulated arm assembly 308, it becomes possible to use the other two arm assemblies 230 and 276 cooperatively to support sensing, testing or measuring devices, for example, to bring apparatus to bear on each of opposed sides of a structural element 60 so as to measure through thickness or to send information-generating signals into to explore the condition of including the structural integrity of the structural member.

Such a functional arrangement, and disposition of apparatus is indicated in FIG. 6. The third articulated arm assembly 308 includes a lower arm 312 provided with a drive motor 314, and a second arm 318 with its separately controlled drive motor 322. The second arm 318 supports a motor 326 for controlled manipulation of a device 330, in this case a camera. The camera is used to observe the testing or treating procedure being carried out, and provides real time visual information as well as providing data to be incorporated into a permanent, reviewable record.

It will be appreciated that the primary turntable 176, as used in the embodiment of the invention depicted in FIG. 6, may be manipulated independently to provide overall orientation of the cooperating turntables 220, 270 and 300 carried thereon.

While there have been described what are considered to be preferred embodiments of the invention, it will be obvious to those skilled in the art that various changes and modifications may be made without departing from the invention, and it is intended that the appended claims cover all such modifications as fall within the spirit and scope of the invention.

What is claimed is:

1. A method for perusal, rigorous inspection, testing and treating of architectural and of mechanical structures and for examination to determine state of repair, construction parameters, quality of restorative and corrective work required and in process, to establish building and repair specifications and standards and to determine compliance therewith, said method comprising the steps of:
    securing to a structure controllably movable carrier means for support of scanning, testing treatment and sensor apparatus and equipment thereon,
    fastening selectively-positionable, elongated guide means to the mechanical structure for supporting said carrier means and for delineating an inspection path to be traversed by said carrier means,
    providing drive means and means for energizing said drive means for remotely controlling movement of said carrier means along a selectable predetermined inspection path correlated with a course of travel defined by said guide means,
    remotely controlling said drive means and remotely controlling the movement of said carrier means, remotely controlling movement of said equipment and apparatus carried by said carrier means along a selectable, predetermined inspection path traversed by said carrier means, and
    providing means for remotely operating said carrier and remotely operating said scanning, testing and sensor apparatus to generate, to transmit, and to receive information and data to disclose the condition and the state of the architectural and mechanical structures examined.

2. The method as set forth in claim 1 and further comprising the steps of,
    providing electrical means and transmitting through said electrical means intelligence received by apparatus and equipment supported on said carrier means,
    locating receptor means remote from the apparatus and equipment on said carrier means and operating said receptor means for receiving intelligence transmitted by said electrical means,
    providing transducer means, and converting through said transducer means the intelligence received from the apparatus and equipment on said carrier means into a form susceptible of perception, evaluation, and recordation.

3. The method as set forth in claim 2 and further comprising the step of transmitting control information to apparatus and equipment carried on the carrier means to direct operation of the apparatus and equipment.

4. The method as set forth in claim 1 and further comprising the step of transmitting control information to apparatus and equipment carried on the carrier means to direct operation of the apparatus and equipment.

5. An assembly for use in carrying out remotely controlled viewing, examining, treating and testing of architectural and mechanical structures to determine state of repair, construction parameters, quality of and to establish building and repair specifications and standards, and to determine compliance therewith, said assembly comprising controllably movable carrier means for attachment of scanning, testing and sensing apparatus and equipment thereto, and equipment for carrying out maintenance, refurbishing and restoration procedures, elongated guide means including track means for supporting said carrier means thereon to traverse said track means, fastener means for supporting said track means on and for securing said track means to a structure to be examined, motor means for driving said carrier means to traverse said track means, and means for remotely controlling said motor means, principal positioning means for carrying said apparatus and equipment, means securing said principal positioning means to said carrier means for travel therewith along said track means, and means for controlling rotational orientation of said principal positioning means.

6. The structure as set forth in claim 5 and further comprising, arm means for manipulatively supporting said apparatus and equipment, and means for pivotally supporting said arm means at an end thereof on said principal positioning means, actuator means for controlling and directing remotely-controlled pivotal manipulation of said arm means, coupler means carried by said arm means at an end thereof remote from said positioning means for securing said apparatus and equipment to said arm means.

7. The structure as set forth in claim 6 and further comprising extension arm means for carrying said apparatus and equipment, means for attaching said extension arm means to said arm means as a maneuverable extension thereof, and means carried by said extension arm means at an end thereof remote from said coupler means for attachment of said apparatus and equipment thereto.

8. The assembly as set forth in claim 6 and further comprising electrical means for transmitting intelligence received by apparatus including scanning, testing and sensor equipment transported on said carrier means, receptor means remote from said apparatus and equipment on said carrier means for receiving intelligence transmitted by said electrical means, said receptor means including transducer means for converting the intelligence received from said apparatus and equipment on said carrier means into a form susceptible of perception, evaluation, and recordation.

9. The assembly as set forth in claim 5 and further comprising electrical means for transmitting intelligence received by scanning, testing and sensing apparatus and equipment transported on said carrier means, receptor means remote from scanning, testing and sensor equipment on said carrier means for receiving intelligence transmitted by said electrical means, said receptor means including transducer means for converting the intelligence received from scanning, testing and sensor equipment on said carrier means into a form susceptible of perception, evaluation, and recordation.

10. The assembly as set forth in claim 5 wherein said principal positioning means includes turntable means.

11. The structure as set forth in claim 5 and further comprising, second positioning means for carrying apparatus and equipment, and means securing said second positioning means to said carriage means for traversing travel along said track means, drive means for driving and controlling rotational displacement of said secondary positioning means during selective positioning and orientation of equipment and apparatus carried thereby.

12. The assembly as set forth in claim 11 wherein said second positioning means includes turntable means.

13. The structure as set forth in claim 11 and further comprising third positioning means for carrying apparatus and equipment, and means for securing said third positioning means to said carriage means for traversing travel along said track means, and drive means for driving and controlling rotational displacement of said third positioning means during selective positioning and orientation of equipment and apparatus carried thereby.

14. The assembly as set forth in claim 13 wherein said third positioning means includes turntable means.

15. The structure as set forth in claim 13 and further comprising fourth positioning means for carrying apparatus and equipment, and means for securing said fourth positioning means to said carriage means for traversing travel along said track means, and drive means for driving and controlling rotational displacement of said fourth positioning means during selective positioning and orientation of equipment and apparatus carried thereby.

16. The assembly as set forth in claim 15 wherein said fourth positioning means includes turntable means.

* * * * *